No. 869,978. PATENTED NOV. 5, 1907.
E. J. MILLER.
PASTEURIZING APPARATUS.
APPLICATION FILED MAR. 11, 1907.
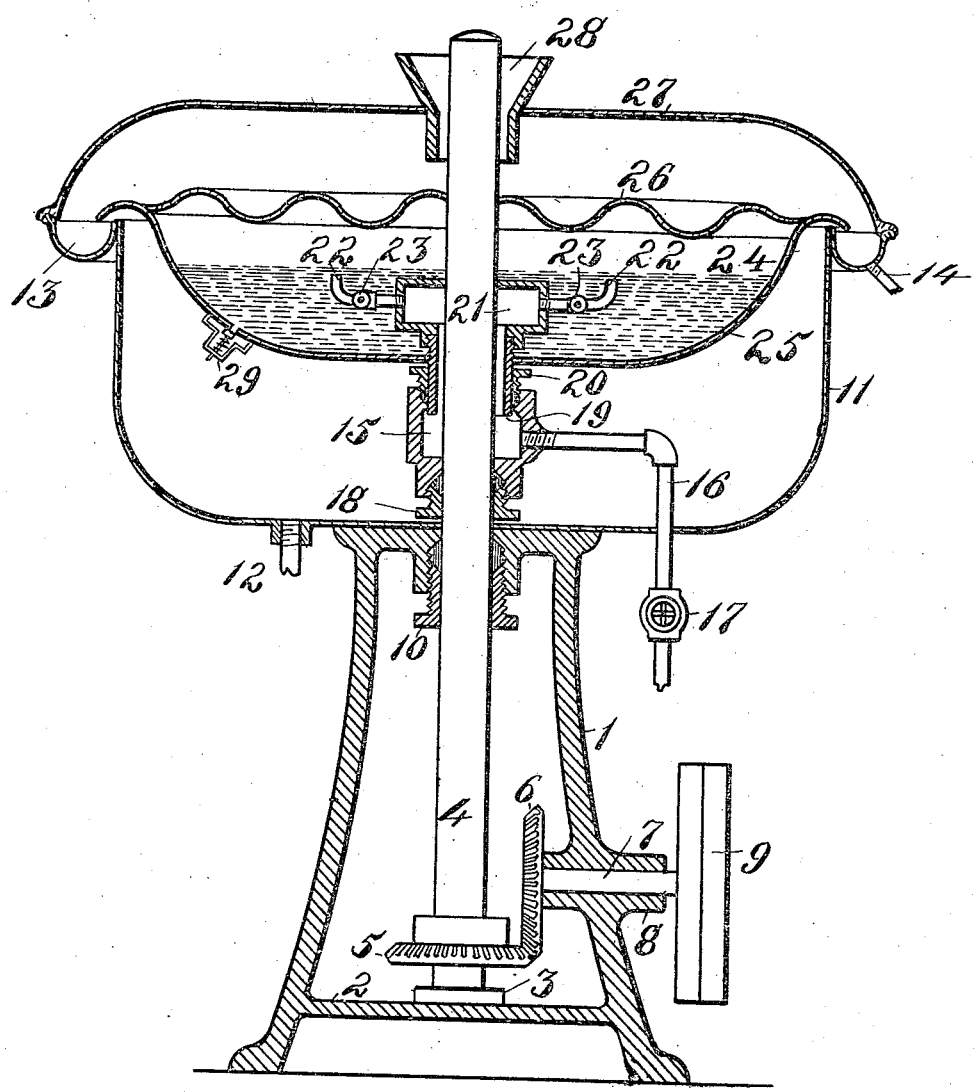

UNITED STATES PATENT OFFICE.

EDWARD J. MILLER, OF CANTON, OHIO.

PASTEURIZING APPARATUS.

No. 869,978.   Specification of Letters Patent.   Patented Nov. 5, 1907.

Application filed March 11, 1907. Serial No. 361,728.

*To all whom it may concern:*

Be it known that I, EDWARD J. MILLER, a citizen of the United States, residing at Canton, in the county of Stark and State of Ohio, have invented new and useful Improvements in Pasteurizing Apparatus, of which the following is a specification.

This invention relates to pasteurizing apparatus of the general type illustrated in the patent granted to Frank Tyson November 14, 1905, No. 804,687, and the objects thereof are to produce an efficient device for the pasteurizing of milk or other liquids, containing a new and improved means for accomplishing this effect without the danger of intermingling with the pasteurized product any of the liquid used for maintaining the temperature of the device.

The invention further contemplates the forming of the surface over which the milk is distributed during the treatment in such a form that the progress of the milk from the center thereof to the circumference is retarded by the utilization of a plurality of annular corrugations formed in the treating surface for the purpose of more completely subjecting the milk to the action of heat during the pasteurization thereof.

Other new and novel details of construction are employed which will be more specifically described later.

A practical embodiment of my invention is illustrated in the accompanying drawing which is a vertical, central section of my improved device.

In the drawing, the reference numeral 1 indicates an upright standard having across its lower end a web 2 provided centrally with a step 3 in which is mounted an upright rotatable shaft 4. This shaft 4 bears on its lower end a beveled gear 5 arranged to mesh with a beveled gear 6 mounted on a shaft 7 in a bearing 8 in the side of the standard 1. The outer end of this shaft 7 is provided with tight and loose pulleys for the reception of a belt used in communicating motion thereto. At the point where the shaft 4 passes through the top of the standard 1 there is provided a stuffing box 10 to prevent the escape of liquid down the shaft. Mounted on the top of the standard 1 is a tank 11 tightly engaging the shaft 4 and secured firmly to the standard 1 and further provided with an open vent or drain 12 in its lower end. Surrounding the upper portion of the tank 11 is a trough 13 secured to the tank and supported thereby and provided at one or more places with an off-take pipe 14. Inclosing the shaft 4 immediately above the bottom of the tank 11 is a hollow steam chamber 15 to which extends an inlet pipe 16 closed by a cock 17 by which steam is admitted to the interior of the chamber. This chamber is provided at its bottom portion with a stuffing box 18 to prevent the leakage of steam therefrom. Projecting into the chamber 15 from above is a short pipe 19 surrounding the shaft 4 and of considerably greater diameter, thereby leaving an annular space between the two. At the point where this pipe 19 enters the chamber 15 the joint is made steam tight by means of a stuffing box 20. Mounted on the upper end of the pipe 19 is a distributing chamber 21 tightly secured to the shaft and to the pipe 19 and designed to rotate therewith. From the distributing chamber 21 extend a plurality of discharge pipes 22 from which the steam which enters the chamber 15 from the pipe 16 may escape. I preferably place in the discharge pipes 22 a member 23 provided with openings for the purpose of permitting the water to enter and be discharged outwardly with the steam at the end of the discharge pipes. Secured fixedly on the pipe 19 is a fluid tank 24 composed of a bottom member 25 preferably in the shape of an ordinary saucer and provided with a top 26 formed with a plurality of annular corrugations for a purpose to be later described. This top 26 forms a tight joint with the shaft 4, so that steam or liquid confined therein will not escape. The outer edges of the lower portion 25 of the tank 24 are convex in formation and bend over the top edge of the main tank 11 and extend downwardly into the trough 13 a short distance. Mounted on the outer edge of the trough 13 is a cover 27 provided at its central portion with a filling funnel 28 surrounding the shaft 4, the use and operation of which will be described later. In the bottom portion 25 of the tank 24 is a safety valve 29 so designed that when excessive pressure exists in the tank 24 the valve will open and permit the escape of the accumulated fluid into the tank 11 from whence it escapes through the vent 12.

The operation of this device is as follows:—Power is communicated to one of the pulleys 9 by a belt, which in turn revolves the beveled gear 6, the motion of which is communicated to the intermeshing gear 5, which being fixedly secured on the shaft 4, in turn rotates this shaft. The distributing chamber 21 being fixedly secured to the shaft revolves with it as does also the pipe 19 and tank 24. During the revolution of the tank 24 steam is admitted through the pipe 16 to the chamber 15 and from thence it passes upwardly to the distributing chamber 21 and from thence outwardly through the discharge pipes 22 and impinges against the under surface of the top 26 of tank 24 which being cold at the start rapidly condenses the steam until water has accumulated in the tank sufficiently to cover the upper ends of the discharge pipes 22. By this time the tank has become sufficiently warm and the constant ingress of steam maintains it in this condition during the pasteurizing process, and as the steam discharges through the ends of the pipes 22, it draws water in through the openings in the members 23 and outwardly with the steam and upwardly against the upper face of the top 26, which serves to keep this top at the correct temperature during the operation of the device. When it is desired to pasteurize milk a desired quantity is poured into the filling funnel 28 and this flow is kept up indefinitely and as the milk flows upon the top 26 it is driven by centrifugal force outwardly from the shaft 4 over the various corrugations therein until it falls into the trough 13 from whence it is drawn away by means of the off-take pipe 14. It will be noted that there is no danger in this device that the water can by any possibility enter the trough 13, for the reason that the tank 24 is substantially hermetically sealed at all times. This is not the case with the ordinary devices of this type and hence this is one of the primary objects sought to be obtained by this invention. It will be obvious that if the tank 11 were filled with water the tendency of the centrifugal action of the tank 24 would cause the water to be thrown over the top of the tank 11 into the trough 13, thereby causing serious deterioration of the milk contained therein.

What I claim and desire to secure by Letters Patent, is:—

1. A device of the class described comprising a rotatable sealed tank the top whereof constitutes a treating plate for the reception of a liquid to be treated transversely-arranged with respect to the axis of rotation of said tank, a collecting trough surrounding said tank for receiving the liquid from said treating plate, means for introducing to said tank a heating medium, and means for rotating the same.

2. A device of the class described comprising a rotatable member, means for rotating the same, a sealed tank mounted on said member arranged to move in unison therewith the top of which constitutes a treating plate, a collecting trough surrounding said treating plate arranged to receive liquid therefrom, means to introduce a heating medium to said tank, and means to deposit liquid to be treated on the central portion of said treating plate.

3. A device of the class described comprising a horizontally-rotatable sealed tank, the top whereof is arranged to constitute a treating plate transverse to the axis of rotation of said tank, means to rotate said tank, a receiving trough surrounding said treating plate arranged to receive liquid therefrom, means to deposit liquid on the upper surface of said treating plate near the center thereof, and a safety valve carried by said tank arranged to prevent excessive pressure in said tank.

4. A device of the class described comprising a rotatable sealed tank, the upper surface of the top whereof is arranged to constitute a treating plate transverse to the axis of rotation of said tank, said treating plate being provided with a plurality of concentric corrugations, a collecting trough surrounding said treating plate to receive liquid therefrom, means to supply liquid to said treating plate near the center thereof, means to heat the interior of said tank, and means to revolve the same.

5. A device of the class described comprising a shaft suitably mounted, means to rotate said shaft, a stationary tank inclosing the upper end of said shaft, a collecting trough inclosing the upper end of said tank, an outlet to said collecting trough, a drip for said tank, a rotatable sealed tank mounted on the upper end of said shaft the upper surface of the top of which is arranged to constitute a treating plate having a downturned outer edge arranged within said collecting trough, means to introduce a heating medium into said rotary tank whereby the upper surface is constantly maintained at a definite temperature, and means to deposit on said treating plate near the center thereof a liquid to be treated.

6. A device of the class described comprising a suitably-supported rotatable sealed tank the upper surface of the top of which is arranged to constitute a treating plate, a collecting trough surrounding said treating plate to receive liquid therefrom, said treating plate being mounted transverse to the axis of rotation of said tank, means to introduce to the interior of said tank a heating medium, a stationary tank arranged to surround said first tank and support said collecting trough, a safety valve in said first tank operable at a predetermined pressure within said first tank, the drip whereof is arranged to flow into said stationary tank, and means to revolve said first named tank.

7. A device of the class described comprising a rotatable sealed tank, the upper surface of the top of which is arranged to constitute a treating plate provided with a plurality of concentric corrugations and a downturned outer edge, a collecting trough surrounding said tank to receive liquid from said treating plate, a stationary drip-collecting tank surrounding said first tank arranged to support said collecting trough, means to revolve said first tank, and means to introduce a heating medium thereto.

8. A device of the class described comprising a suitably-supported shaft, means to rotate the same, a stationary tank inclosing the upper end of said shaft, a rotatable sealed tank mounted on said shaft arranged to be moved in unison therewith within the confines of said stationary tank the upper surface of the top of said rotatable tank being arranged to constitute a treating plate with a downturned outer edge, a collecting trough supported by said stationary tank to receive liquid from said treating plate, means to deposit on said treating plate near the center thereof a liquid to be treated, and means for heating the interior of said rotatable tank.

9. A device for the pasteurization of liquids comprising a sealed rotatable tank the top of which is formed with a plurality of concentric corrugations arranged to constitute a treating plate, means for introducing to said tank a heating medium, and means to rotate said tank.

10. A device for the pasteurization of liquids comprising a sealed rotatable tank having a corrugated top to constitute a treating plate, a collecting trough surrounding said treating plate arranged to receive liquid driven therefrom by centrifugal force, means to deposit liquid to be treated on said treating plate near the center thereof, and means to introduce to the interior of said tank a heating medium.

11. A pasteurizing device consisting of a rotatable sealed tank having a corrugated upper surface constituting a treating plate, said treating plate being transverse to the axis of rotation of said tank, means to support said tank, means to receive liquid driven from said treating plate by centrifugal force, and means to deposit a liquid for pasteurization on said treating plate.

12. A device of the class described comprising a standard, a shaft rotatably mounted thereon, means for rotating said shaft, a stationary tank mounted on said standard inclosing the upper end of said shaft, a collecting trough inclosing the upper edge of said stationary tank, a rotatable sealed tank mounted on said shaft within said stationary tank, the top of said rotatable tank being provided with a plurality of corrugations arranged to constitute a treating plate with a downturned outer edge extending into said collecting trough, means to heat the interior of said rotatable tank, and means for permitting the deposit of a liquid to be treated on the central portions of said treating plate.

13. A device for the pasteurization of liquids comprising a closed rotatable tank the top of which is arranged to constitute a treating plate, means for receiving a liquid driven from said top by centrifugal force, means for controlling the temperature of said treating plate, and means for rotating the same.

In testimony whereof I have hereunto set my hand in presence of two subscribing witnesses.

EDWARD J. MILLER.

Witnesses:
 GLENARA FOX,
 C. E. HUMPHREY.